United States Patent [19]

Heine

[11] 4,367,718

[45] Jan. 11, 1983

[54] FUEL PREHEATING DEVICE

[76] Inventor: Jacob Heine, 3349 Wunder Ave., Cincinnati, Ohio 45211

[21] Appl. No.: 198,535

[22] Filed: Oct. 20, 1980

[51] Int. Cl.³ ............................................. F02M 31/00
[52] U.S. Cl. .................................... 123/557; 123/549; 219/301; 219/207
[58] Field of Search ................ 123/549, 557; 219/206, 219/207, 208, 301, 535, 536, 526, 542; 138/33

[56] References Cited

U.S. PATENT DOCUMENTS

| 1,005,395 | 10/1911 | Wohl | 219/301 |
| 1,293,456 | 2/1919 | Johns | 219/207 |
| 3,214,571 | 10/1965 | Indoe | 219/301 |
| 3,548,158 | 12/1970 | McCaskill | 138/33 |
| 4,089,314 | 5/1978 | Bernecker | 123/557 |

FOREIGN PATENT DOCUMENTS

| 839763 | 5/1952 | Fed. Rep. of Germany | 123/557 |
| 1904212 | 8/1970 | Fed. Rep. of Germany | 123/557 |

*Primary Examiner*—Ronald H. Lazarus
*Attorney, Agent, or Firm*—Kinney and Schenk

[57] ABSTRACT

A preheating device, particularly adapted to preheat fuel to an internal combustion engine, includes a pair of resistive heating elements which are held in resilient compressive juxta-positional heat transfer relationship with a fluid conduit by a retaining clip.

4 Claims, 9 Drawing Figures

FUEL PREHEATING DEVICE

The invention relates generally to heating devices and more particularly concerns a preheating device for a fuel line. Although the invention has utility with any type of fluid conduit which requires heating, for example, in oil furnaces for home heating, it is especially useful as a preheating device to preheat and condition fuel for an internal combustion engine. The invention will be specifically disclosed in connection with such an application.

There is an abundance of prior art dealing with preheating fuel for internal combustion engines prior to the fuel's combustion. When used in an internal combustion engine for a vehicle, preheating the fuel results in improved engine performance, improved fuel mileage and reduced polution. The prior devices for this purpose utilize techniques which range from wrapping the fuel line around a source of heat such as the engine manifold or exhaust pipe to passing the fuel line through sophisticated heat exchangers. While many of these previous attempts have proved to be successful, they are not without attendant disadvantages. For the most part, these previous devices have been expensive and are commonly bulky insize or difficult to install. These factors have limited the use of the previous devices, especially among owners of vehicles without such devices who may wish to retrofit their engines.

It is thus an object of the present invention to provide a preheatng device for a fuel line which is inexpensive and easy to install.

It is a further object of the present invention to provide a fuel preheating device that is readily retrofittable on almost any vehicle engine.

It is a further object of the present invention to provide a preheating device which provides direct heating of the fuel line without the necessity of an intermediate heat transfer media.

It is a further object of the present invention to provide a preheating device for an internal combustion engine that may be readily positioned on the fuel line proximal to a carburetor.

SUMMARY OF THE INVENTION

In accordance with one aspect of the invention, a fuel preheating device is provided in combination with an internal combustion engine having a fuel conduit for supplying fuel to the engine. The preheating device includes a pair of elongated electrical resistance heating elements which are securely held by a retaining clip. The retaining clip holds one of said pair of electrical heating elements proximal to each of the clips' lateral extremities so that each one of said pair of elongated heating elements are in juxtapositional contacting relationship with the fuel conduit on opposite sides of the fuel conduit. The heating elements are biased by the retaining clip to compressingly engage the fuel conduit between themselves. The retaining clip spans the fuel conduit between the heating elements along the entire length of the heating elements to inhibit heat transfer between those heating elements and the atmosphere. Means are also provided for connecting the heating elements to an electrical power source.

In accordance to a further aspect of the invention, the heating elements are held in generally spaced relationship by the retaining clip with the space between the heating elements being less than the diametral dimension of the fuel conduit when the clip is in an unbiased state. The retaining clip is also resiliently movable to space the heating elements by a distance which exceeds the diametral dimension of the fuel line.

In accordance to a further aspect of the invention, the retaining clip is formed of an electrically conductive material.

A further aspect of the invention includes a means for limiting the temperature of the preheating device.

In accordance to still another aspect of the invention, a fuel preheating device for heating fuel in a fluid conduct is provided which includes a resilient retaining clip of electrically conductive material which is adapted to partially envelop a fuel conduit. An electrical resistance heating element is secured to the retaining clip and is adapted to open against the clips resilient bias to compressingly engage a fuel conduit and to place the electrical resistance heating element in juxtapositional heat transfer relationship with a fuel conduit engaged by the retaining clip. Means are also provided for electrically connecting the electrical resistance heating element to an electrical power source.

BRIEF DESCRIPTION OF THE DRAWINGS

Other objects and advantages of the invention will become apparent upon reading the following detailed description and upon reference to the drawings, in which.

While the invention will be described in connection with a preferred embodiment, it should be understood that it is not intended to limit the invention to that embodiment. On the contrary, it is intended to cover all alternatives, modifications, and equivalents as may be included within the spirit and scope of the invention as defined by the appended claims.

DETAILED DESCRIPTION OF THE PREFERRED EMBODIMENT

Figure 1:
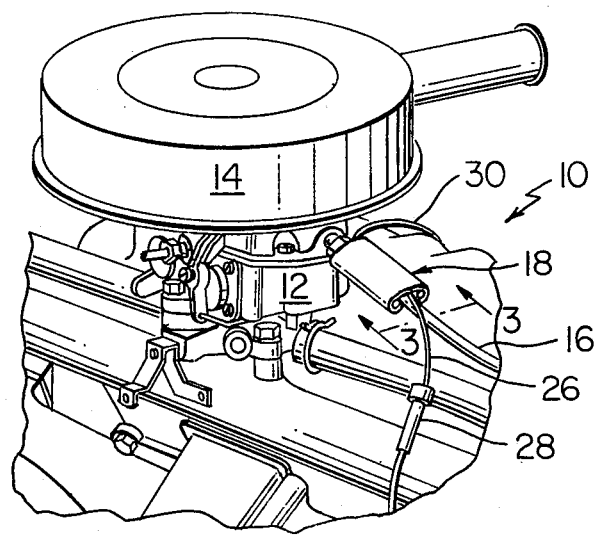
FIG. 1 is a perspective environmental view of an internal combustion engine illustrating the fuel preheating device of the present invention in contacting heat transfer relationship to the incoming fuel line of the internal combustion engine in close proximity to a carburetor.

Referring now to the drawings and to FIG. 1 in particular, an internal combustion engine generally designated by the numeral 10 of the type commonly used in motor vehicles such as automobiles is illustrated. The illustrated internal combustion engine 10 includes a carburetor 12 which is disposed beneath an air inlet filter 14. As is well known in the art, a fuel line or conduit 16 is shown which delivers gasoline or other fuel from a fuel pump (not shown) to the carburetor 12.

Figure 2:
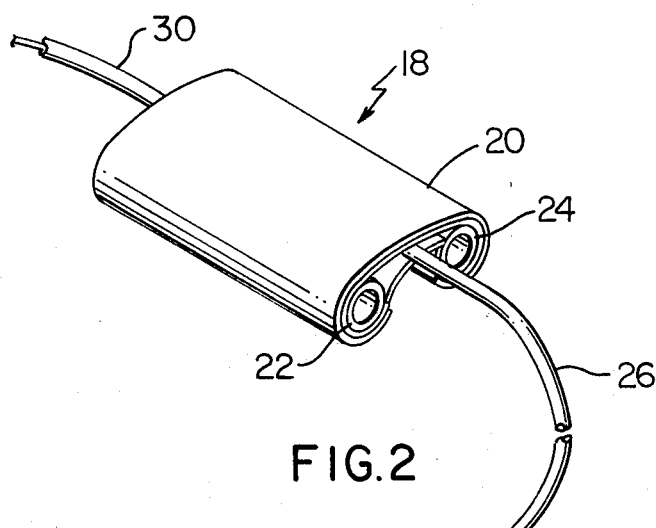
FIG. 2 is a perspective view of the preheating device of FIG. 1 removed from the internal combustion engine for clarity.

A fuel preheating device 18 made in accordance with the present invention is shown attached to the fuel line 16 in close proximity to the carburetor 12. As shown in greater detail in FIG. 2, which shows the preheating device isolated from the internal combustion engine 10 and fuel line 16, the preheating device 18 includes a curved retaining clip 20 which securely holds a pair of attached electrical resistance heating elements 22 and 24. The heating elements 22 and 24 are generally cylindrically shaped and disposed in spaced parallel relationship to each other. These heating elements 22 and 24 are retained by a retaining clip 20 of the preheating device 18, which retaining clip circumferentially envelopes a large peripheral section of each of the heating elements. The partial envelopment of the heating elements 22 and 24 is achieved by forming both ends of the retaining clip 20 with an arcuate configuration having an internal radius which closely approximates the external radius of the heating elements 22 and 24 so as to be tightly fitted against these heating elements 22 and 24.

A lead line 26 delivers electrical energy to the preheating device 20 and to the resistive heating elements 22 and 24 in particular, from an electrical power source (not shown). In an internal combustion engine of an automobile, the electrical power source would likely be the automobile battery, connected through the ignition system so as to terminate flow of electrical current to the heating elements whenever the engine 10 was turned off. A fuse 28 is interposed in the lead line 26 to terminate current flow in the event of a power surge or electrical short circuit. In the preferred embodiment, fuse 28 is a 1½ amp fuse.

Figure 3:
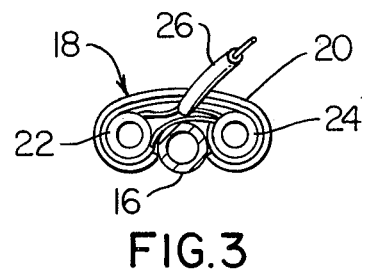
FIG. 3 is a cross sectional view of the preheating device of FIG. 2 as it would appear in contacting relationship with a fuel line.

FIG. 3 shows each of the elongated electrical heating elements 22 and 24 in juxtapositional contacting relationship to the fuel line 16. The heating elements 22 and 24 are positioned on opposite sides of the fuel line 16 and are biased by retaining clip 18 to compressingly engage the interposed fuel line with sufficient force to secure the preheating element 20 to the fuel line against the element's gravity bias. This will enable the preheating element to be secured to the fuel line 16 irrespective of the orientation of the fuel line 16 or the preheating element 18. In many circumstances, however, it will be preferable to orient the preheating element 18 such that the open side of retaining clip 20 is exposed to the engine 10 and the retaining clip 20 spans the heating elements 22 and 24 along their entire length on the opposite side of the fuel line 16 to inhibit or partially block heat transfer or loss to the atmosphere. It is thus seen that the retaining clip 20 not only serves to hold the heating elements 22 and 24, but also to bias those elements 22 and 24 into compressive engagement with a fuel line disposed between the elements and to block heat loss to the atmosphere.

Figure 4:
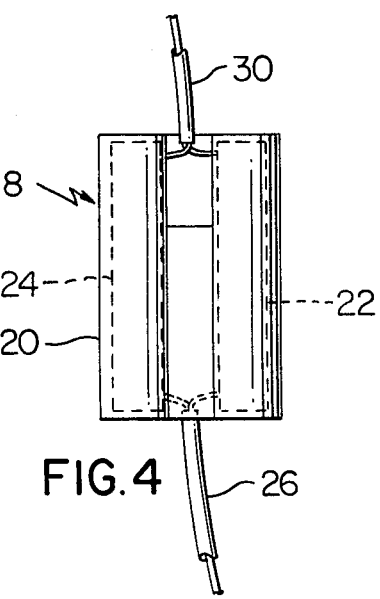
FIG. 4 is a bottom view of the preheating device of FIGS. 1-3.

The retaining clip 20 is preferably formed of a metal which is an electrical conductor. When such is the situation, it is frequently unnecessary to provide a seperate ground wire when the fuel conduit is also formed of a metal. Instead, the ground connection can be made through the retaining clip and the fuel line. A seperate ground wire will be necessary, however, when the fuel line is formed of a non-conductive material such as rubber. The bottom view of the preheating element 18 in FIG. 4 shows such a ground wire 30.

Figure 5:
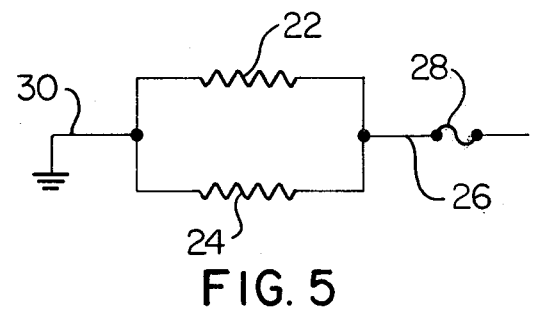
FIG. 5 is a schematic circuit diagram of the electrical components of the preheating device of FIGS. 1-4.

FIG. 5 depicts a simple electrical diagram of the preheating element 18 wherein an inlet line 26 supplies electrical current to a pair of resistive heating elements 22 and 24 through a fuse 28. Each of the elements 22 and 24 are connected to ground by ground wire 30. In the preferred embodiment of FIGS. 1-4, resistive heating elements 22 and 24 are 20 ohm, 10 watt resisters.

Figure 6:
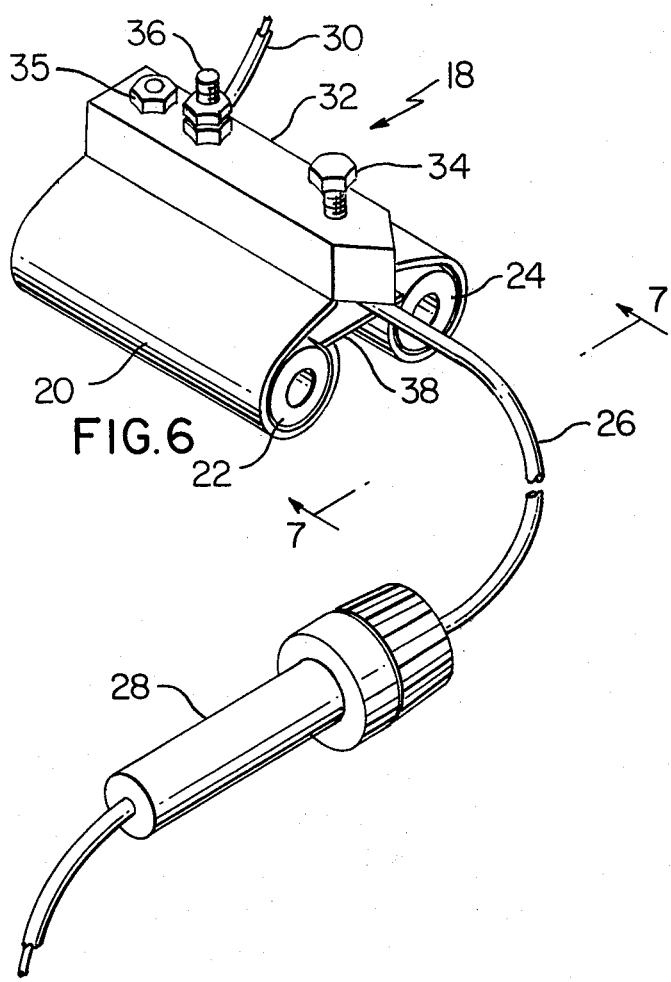
FIG. 6 is a perspective view of another embodiment of a preheating device with a temperature sensing element.

A second embodiment of the present invention is shown in FIG. 6 in which similar numbers have been used on the drawings to represent similar elements from the embodiment of FIGS. 1-5 to simplify explanation. Like the embodiment of FIGS. 1-5, the embodiment of FIG. 6 includes a pair of cylindrically shaped electrical resistive heating elements 22 and 24 which are circumferentially enveloped by a spring like retaining clip 20 to hold the heating elements 22 and 24 in generally parallel spaced relationship. The retaining clip 20 spans the space between the heating elements 22 and 24 along the entire expanse or length of the elements to form a space between the elements 22 and 24 which is slightly smaller than the diametral dimension of the fuel conduit 16 which the preheating element 18 is intended to heat.

Figure 7:
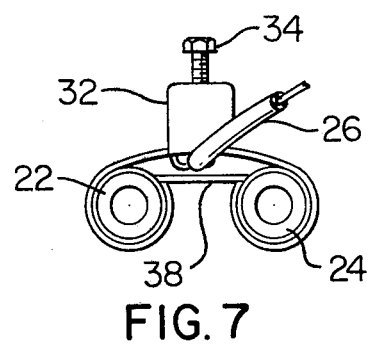
FIG. 7 is a cross sectional view of the preheating device of FIG. 6 taken along line 7—7 of FIG. 6.

Unlike the embodiments of FIGS. 1-5, FIG. 6 has a temperature control. Applicant has found that in many applications, such as heating fuel for an internal combustion engine, it is possible to overheat the fuel within the conduit. In order to avoid this contingency, a bi-metal thermostat is provided. This thermostat is contained within an enclosure or housing 32 illustrated in FIGS. 6 and 7 wherein the enclosed bi-metal thermostat is positioned atop the retaining clip above the space between the heating elements 22 and 24, which in this preferred embodiment are 15-20 ohm, 20 watt resisters. An adjusting screw 34 is axially advanceable into a threaded opening of the enclosure or housing 32 to move the bi-metals and adjust the cut-off temperature for the heating element 18. The housing is secured to the retaining clip 18 by appropriate fastening members such as the illustrated nut and bolt 35. This nut and bolt 35 also are attached to the bi-metals to secure them to the retaining clip 18. An electrical terminal 36 is also illustrated to which a ground wire 30 may be connected. In addition, this ground terminal is also secured to the bi-metal elements to help support them against the retaining clip 18. As perhaps shown most clearly in FIG. 7, an insulating material 38 is optionally placed between the heating elements 22 and 24 and the incoming lead line 26 to reduce the possibility of an electrical short circuit between the incoming lead line 26 and the retaining clip 20. Obviously, in many constructions, this precaution will be unnecessary.

Figure 8:
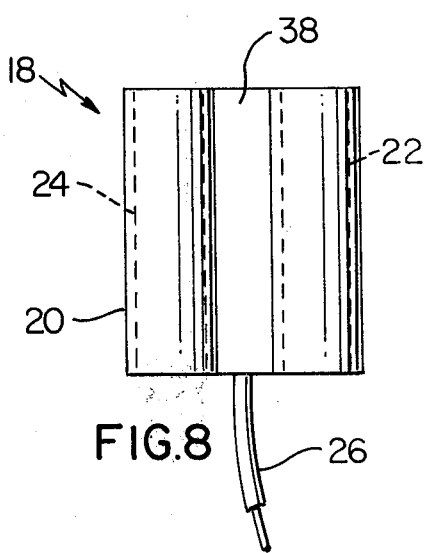
FIG. 8 is a bottom view of the preheating device of FIGS. 6-7.
Figure 9:
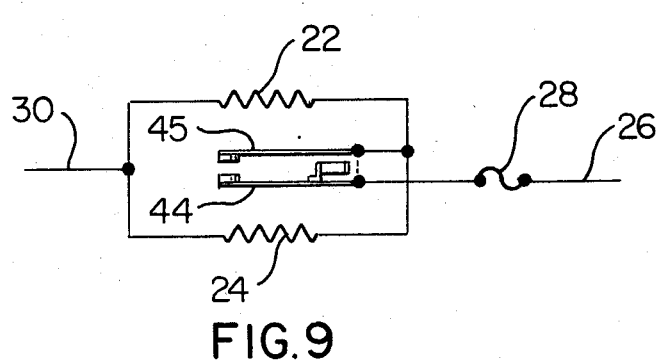
FIG. 9 is a schematic circuit diagram of the electrical components of the preheating device of FIGS. 6-8.

FIG. 8 represents a bottom view of the embodiment of FIG. 6 which is similar to the bottom view depiction of the FIG. 1 embodiment with similar numbers depicting similar components. Similarly, FIG. 9 shows a schematic illustration of the electrical components of the embodiment of FIG. 6. It also resembles FIG. 5 with similar numbers showing similar components to those illustrated in FIGS. 1-5. Unlike FIG. 5, however, FIG. 9 also illustrates a conventional bi-metal thermostat interposed between the heating elements to limit electrical current to the heating elements after a predetermined temperature has been obtained. The bi-metal includes two separate strips of metals having different rates of thermal expansion and contraction, 34 and 35. When the predetermined temperature has been reached, contact between the respective metal strips terminates and electrical current to the heating elements 22 and 24 is similarly terminated.

As should be apparent to those skilled in the art in light of the foregoing description, applicant's preheating device offers substantial advantages over those of the prior art. First, due to the relatively small size and ready adaptability of the device, it can be easily, quickly and retrofittably secured to a fuel line in virtually any space limitation. When used in combination with an internal combustion engine having a carburetor, these same features permit placement of the preheatng device in close proximity to the carburetor, a placement which increases the efficiency of the preheating device to preheating condition the fuel prior to combustion. The device also has great utility with internal combustion engines without carburetors, as for example diesels. It will also be noted that applicant's device is a direct heating device and does not require any intermediate heating transfer media. Applicants device also includes a temperature limiting means which, for example, on an internal combustion engine, will prevent the temperature from reaching such a level that would cause vaporlock in the engine.

Thus it is apparent that there has been provided, in accordance with the invention, a device that fully satisfies the objects, aims and advantages set forth above. While the invention has been described in conjunction with a specific embodiment thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. In combination with an internal combustion engine having a fuel conduit for supplying fuel to the engine, a fuel preheating device, comprising:
   (a) a pair of elongated electrical resistance heating elements;
   (b) a retaining clip which securely holds said pair of electrical heating elements in spaced parallel relationship to each other, said retaining clip resiliently biasing each one of said pair of elongated heating elements in juxtapositional contacting heat transfer relationship with the fuel conduit on opposite sides of the fuel conduit so as to compressingly engage the fuel conduit between the heating elements, said retaining clip spanning the fuel conduit between the heating elements along substantially the entire length of the heating elements to inhibit heat transfer between the heating elements and the atmosphere; and
   (c) means for connecting said heating elements to an electrical power source.

2. A preheating device as recited in claim 1 wherein said heating elements are held proximal to each of the clip's lateral extremities, the space between said heating elements being less than the diametral dimension of fuel conduit when said clip is in a free unbiased state, said retaining clip being resiliently movable to space said heating elements by a distance which exceeds the diametral dimension of said fuel line.

3. A preheating device as recited in claim 2 further including a means for limiting the temperature of said preheating device.

4. A preheating device as recited in claim 3 wherein said retaining clip is formed of an electrically conductive material.

* * * * *